United States Patent
Koschel et al.

(10) Patent No.: US 9,863,450 B1
(45) Date of Patent: Jan. 9, 2018

(54) HYDRO-MECHANICAL DEVICE WITH PRELOADED FLOW REGULATING ASSEMBLY

(71) Applicants: Martin Koschel, Santa Ana, CA (US); Ryan D. Fleming, Anaheim, CA (US); Andrew M. Wright, Costa Mesa, CA (US); Paul D. March, Chino Hills, CA (US); Ryan P. Dermawan, Covina, CA (US)

(72) Inventors: Martin Koschel, Santa Ana, CA (US); Ryan D. Fleming, Anaheim, CA (US); Andrew M. Wright, Costa Mesa, CA (US); Paul D. March, Chino Hills, CA (US); Ryan P. Dermawan, Covina, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 512 days.

(21) Appl. No.: 14/254,864

(22) Filed: Apr. 16, 2014

(51) Int. Cl.
| | | |
|---|---|---|
| *F15B 15/20* | (2006.01) | |
| *B62K 21/08* | (2006.01) | |
| *F16F 9/14* | (2006.01) | |

(52) U.S. Cl.
CPC ............ *F15B 15/204* (2013.01); *B62K 21/08* (2013.01); *F16F 9/14* (2013.01)

(58) Field of Classification Search
CPC ...... F16F 9/14; F16F 9/145; F16F 9/16; F16F 9/50; F16F 9/53; F15B 15/204
USPC .......................................................... 188/269
See application file for complete search history.

(56) References Cited

U.S. PATENT DOCUMENTS

| | | | | | |
|---|---|---|---|---|---|
| 1,529,878 | A | * | 3/1925 | De Ram ................... | F16F 9/18 188/269 |
| 3,361,422 | A | * | 1/1968 | Theuleau .................. | F16F 9/08 188/269 |
| 3,698,516 | A | * | 10/1972 | Williams ................ | F16H 33/02 185/39 |
| 3,765,624 | A | * | 10/1973 | Kaniuka ................. | B64C 13/24 244/227 |
| 4,773,514 | A | * | 9/1988 | Gustafsson ............ | B62K 21/08 188/306 |
| 5,058,825 | A | * | 10/1991 | Rabouyt ................. | B64C 27/52 244/17.25 |
| 6,138,596 | A | * | 10/2000 | Gonring ................. | B63H 25/10 114/144 R |

(Continued)

*Primary Examiner* — Michael Leslie
*Assistant Examiner* — Richard Drake
(74) *Attorney, Agent, or Firm* — Lawrence N. Ginsberg

(57) ABSTRACT

A hydro-mechanical device for providing tactile feel curve shaping, including: a housing; a fluid displacing element; and, a preloaded flow regulating assembly operatively connected to the housing. The housing has a working fluid chamber formed therein, the working fluid chamber containing working fluid. The fluid displacing element is positioned within the working fluid chamber. The fluid displacing element divides the working fluid chamber into at least two cavities upon which fluid is transferred upon movement of the fluid displacing element. The flow of the working fluid is controlled through the preloaded flow regulating assembly in accordance with a custom force profile combining a controlled velocity dependent force component and a controlled resisting force component which opposes an applied force at a controlled maximum threshold.

18 Claims, 12 Drawing Sheets

(56) References Cited

U.S. PATENT DOCUMENTS

| | | | | |
|---|---|---|---|---|
| 6,606,936 B2* | 8/2003 | Shteynberg | ............ | F15B 11/076 92/121 |
| 6,824,153 B2* | 11/2004 | Hanawa | ................. | F16F 9/145 188/306 |
| 7,021,433 B2* | 4/2006 | Yamada | ................. | B62K 21/08 188/294 |
| 7,228,826 B2* | 6/2007 | Chang | ....................... | F01L 9/02 123/90.12 |
| 7,267,350 B2* | 9/2007 | Yamada | ................. | F16F 9/145 280/272 |
| 7,377,533 B2* | 5/2008 | Takeuchi | ............... | B62K 21/08 280/272 |
| 7,970,511 B2* | 6/2011 | Kohls | .................... | B62K 21/08 188/290 |
| 8,051,962 B2* | 11/2011 | Hara | ...................... | B62K 21/08 188/306 |
| 9,134,086 B2* | 9/2015 | Lim | ........................ | F41A 25/02 |
| 2009/0166989 A1* | 7/2009 | Atsushi | ............. | B60G 17/0416 280/5.503 |
| 2009/0302516 A1* | 12/2009 | Steele | .................... | B64C 13/46 267/140.15 |

* cited by examiner

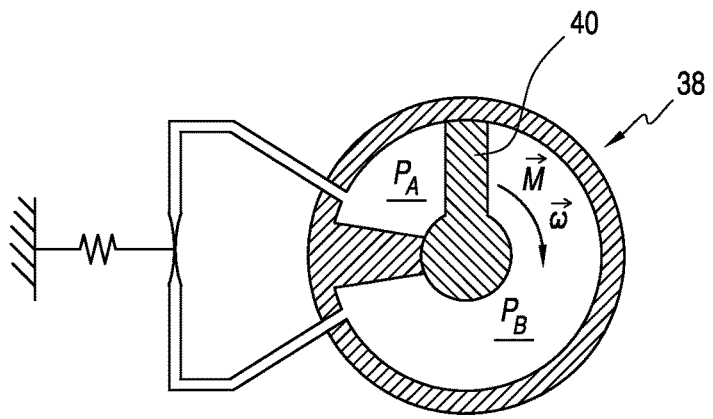
FIG. 4A
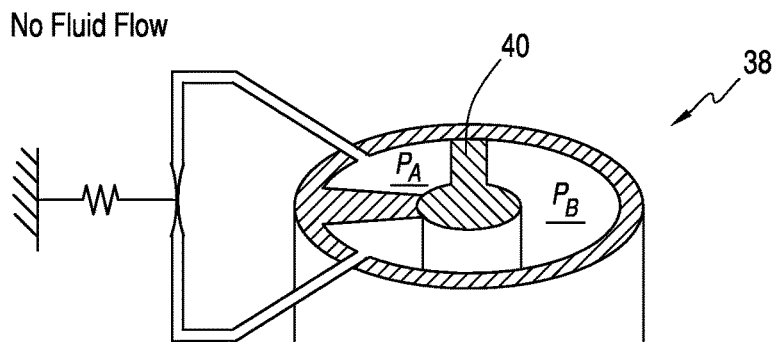
FIG. 4B
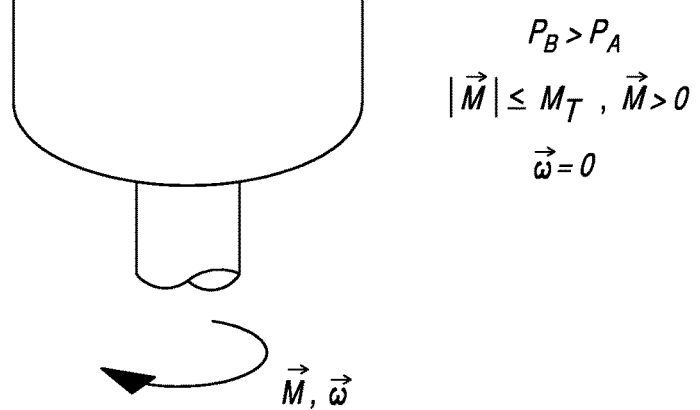
$P_B > P_A$
$|\vec{M}| \leq M_T, \vec{M} > 0$
$\vec{\omega} = 0$

HYDRO-MECHANICAL DEVICE WITH PRELOADED FLOW REGULATING ASSEMBLY

BACKGROUND OF THE INVENTION

1. Field of the Invention

The present invention relates generally to damping devices and more particularly to devices used in human-machine interface systems to generate application-specific tactile feel properties.

2. Description of the Related Art

In a modern aircraft, the pilot controls the aircraft through fly-by-wire controls, where manual inputs are translated into electric signals and then received by an electronic system, which, in turn, controls the deflection of the aircraft's control surfaces. Very often, fly-by-wire systems incorporate specific features designed to emulate system properties inherent to the design of previously common mechanical systems. An apparatus is often used to provide a force at the controls inceptor, which returns it to a predetermined position once operator force is removed—hereinafter referred to as "centering function". The aforementioned apparatus is often combined with a device that superimposes a damping function on the aforementioned centering function. This apparatus often is hydraulic and/or electromagnetic in nature. The purpose of this may be twofold: 1) providing an input speed-dependent resisting force component emulating the tactile feel of a mechanical control system at the inceptor, as well as 2) reducing or preventing inceptor oscillation upon free release. To further emulate the tactile feel properties of a mechanical system, some fly-by-wire control systems incorporate a function to artificially increase the magnitude of the system's hysteresis in a feel force-displacement graph. This device is typically implemented as a brake-type device using either a mechanical friction approach, or an electromagnetic approach. Either type of the aforementioned device has specific performance shortcomings related to feel, stability, or longevity, or any combination thereof. These shortcomings may impact an operator's ability to consistently operate a control system with the required precision, and/or limit the system's operational reliability. Further, the number of individual component parts involved in implementing damping and artificial feel force hysteresis may have economic implications in the manufacture and operation of the control system.

SUMMARY OF THE INVENTION

In a broad aspect, the present invention is a hydro-mechanical device for providing tactile feel curve shaping, including: a housing; a fluid displacing element; and, a preloaded flow regulating assembly operatively connected to the housing. The housing has a working fluid chamber formed therein, and the working fluid chamber containing working fluid. The fluid displacing element is positioned within the working fluid chamber. The fluid displacing element divides the working fluid chamber into at least two cavities upon which fluid is transferred upon movement of the fluid displacing element. The flow of the working fluid is controlled through the preloaded flow regulating assembly in accordance with a custom force profile, combining a controlled velocity dependent force component and a controlled resisting force component that opposes an applied force at a controlled maximum threshold.

In an aspect of the invention, the preloaded flow regulating assembly comprises a preloaded element that prevents flow of fluid between the two cavities until a predetermined pressure is achieved, and affects flow of fluid once the predetermined pressure has been exceeded in cooperation with a flow restriction element that opposes the flow of the working fluid.

In an aspect of the invention, the hydro-mechanical device is incorporated in an aircraft's pilot control system. It provides a mechanism which returns an inceptor to a pre-defined position at a pre-defined position-force relationship. Thus, it provides the functions of speed-dependent feel force and controlled resisting force, to the pilot inceptors, obviating the need for multiple devices to accomplish friction and damping functions.

In another broad aspect, the present invention is a method for damping, including the steps of: a) providing a housing having a working fluid chamber formed therein, said working fluid chamber containing working fluid; b) providing a fluid displacing element positioned within the working fluid chamber, said fluid displacing element dividing the working fluid chamber into at least two cavities upon which fluid is transferred upon movement of said fluid displacing element; c) providing a preloaded flow regulating assembly operatively connected to the housing and fluid displacing element; and, d) controlling the working fluid between said housing, said fluid displacing element, and said preloaded flow regulating assembly to achieve performance characteristics including a force profile combining a controlled velocity dependent force component and a controlled resisting force component which opposes applied force at a controlled maximum threshold.

Other objects, advantages, and novel features will become apparent from the following detailed description of the invention when considered in conjunction with the accompanying drawings.

BRIEF DESCRIPTION OF THE DRAWINGS

FIG. 4A is a top view of a simplified schematic illustration of an operational state of the rotary hydro-mechanical device showing the applied moment (torque), $\vec{M}$, and angular velocity, $\vec{\omega}$.

FIG. 4B is a simplified front perspective view of the hydro-mechanical device of FIG. 4A where the applied moment (torque), $\vec{M}$ is greater than 0, but not of sufficient magnitude to effect motion of the fluid displacing element, such that the angular velocity, $\vec{\omega}$, is equal to 0.

DETAILED DESCRIPTION OF THE INVENTION

Figure 1:
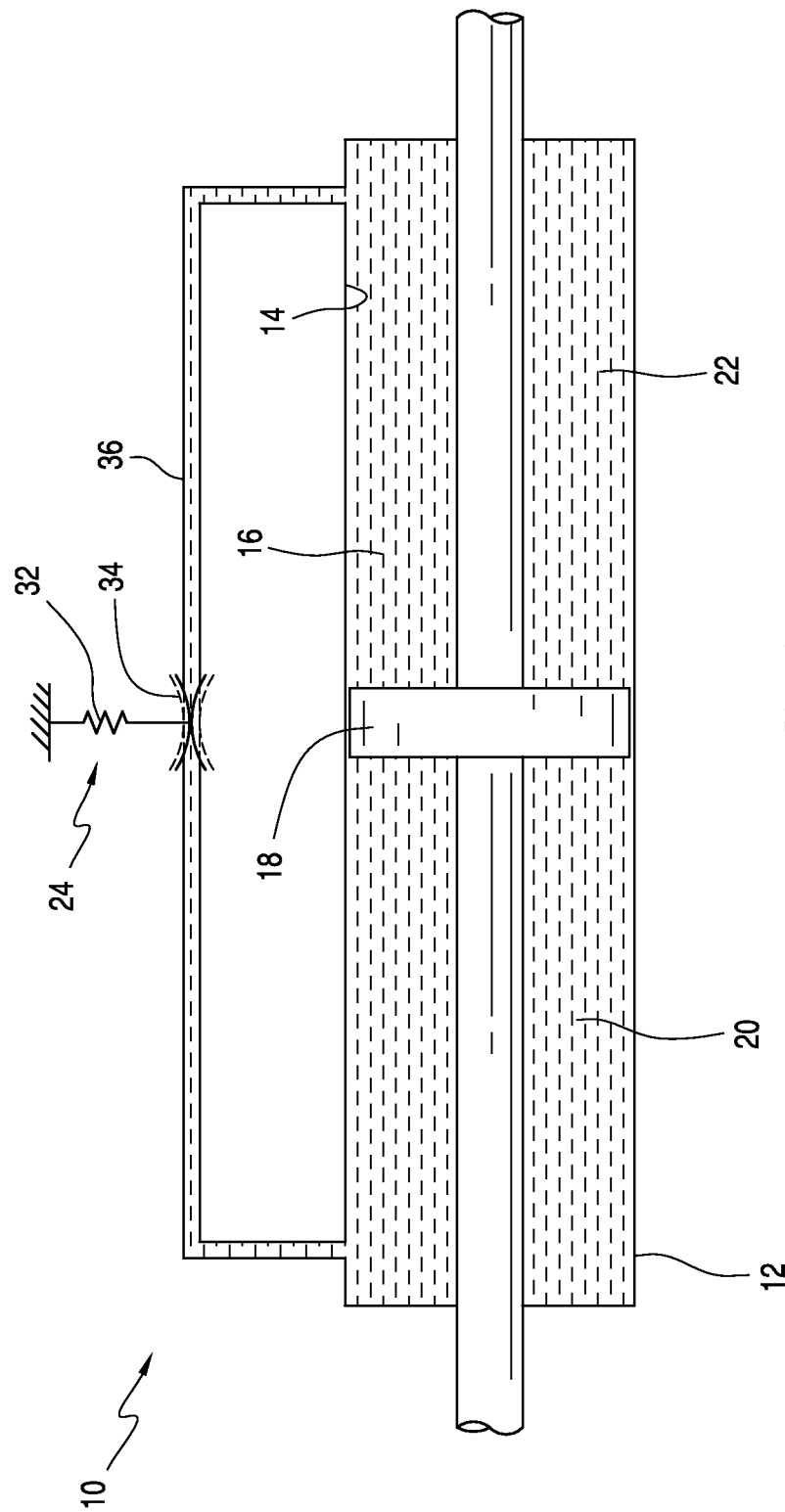
FIG. 1 is a simplified schematic illustration of the hydro-mechanical device of the present invention.

Referring now to the drawings and the characters of reference marked thereon, FIG. 1 illustrates the hydro-mechanical device of the present invention, designated generally as 10. The hydro-mechanical device 10 includes a housing 12 having a working fluid chamber 14 formed therein. The working fluid chamber 14 contains working fluid 16. A fluid displacing element 18 is positioned within the working fluid chamber 14. The fluid displacing element 18 divides the working fluid chamber 14 into two cavities 20, 22 upon which fluid 16 is transferred upon movement of the fluid displacing element 18. The hydro-mechanical device 10 includes a preloaded flow regulating assembly 24 in the working fluid conduit 36 which connects the two cavities 20, 22. The fluid displacing element 18 and the preloaded flow regulating assembly 24 are operatively arranged and cooperate with each other so that the flow of the working fluid is custom controlled in a desired manner to achieve performance characteristics. FIG. 1 does not depict specific seal arrangements necessary to ensure function of the device. These seals are known to those skilled in this field and are omitted from all figures herein for brevity.

Figure 2:
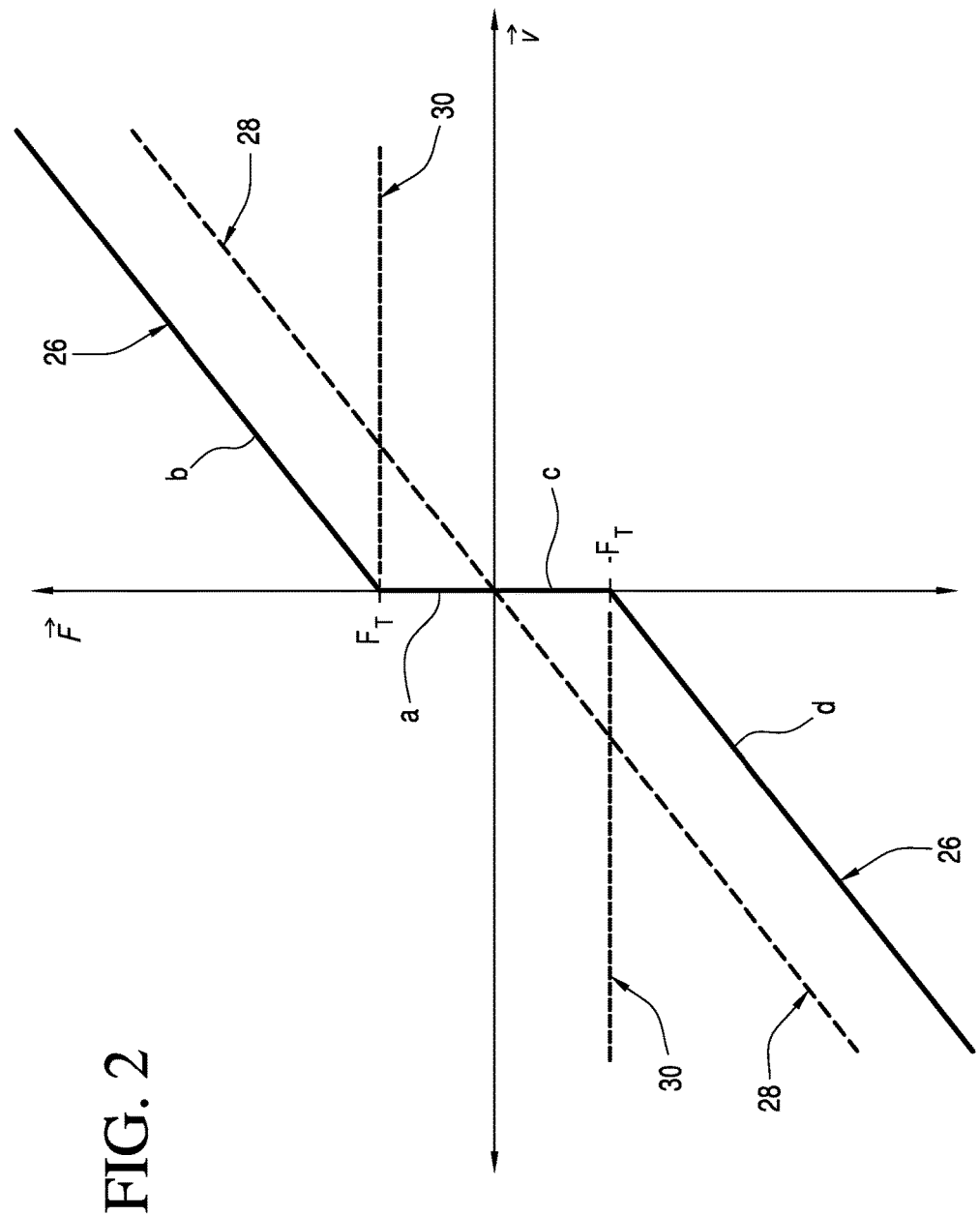
FIG. 2 is a graph indicating the velocity vs. force characteristics of the hydro-mechanical device of FIG. 1.

Referring now to FIG. 2, these performance characteristics include a custom force profile 26 combining a controlled velocity dependent force component 28 and a controlled resisting force component 30 which opposes applied force at a controlled maximum threshold. Referring again now to FIG. 1, the preloaded flow regulating assembly 24 includes a preloaded element 32 and flow restriction element 34. Flow regulating assembly 24 prevents the flow of fluid between the two cavities 20, 22 until a predetermined pressure at the controlled maximum threshold is achieved. This creates the constant resisting force component characteristic denoted by segments "a" and "c" in FIG. 2. Once flow is established the flow restriction element 34 opposes the flow of the working fluid, thereby forming a pressure differential across the flow regulating assembly. The interaction of the preloaded element 32 and the flow restriction element 34 provides the characteristic as denoted by segments "b" and "d" in FIG. 2. This combination provides the specific performance characteristics described herein.

The preloaded element 32 may be, for example, a spring which, by exerting force on the restriction element 34, maintains the conduit of the working fluid closed until a certain magnitude of pressure in the working fluid pathway 36 is exceeded.

The flow restriction element 34 may be, for example, a plunger located within an orifice in the working fluid conduit 36, whereas the orifice and plunger arrangement is designed in a custom, application-specific fashion to have design parameters to achieve desired device performance as a result of the variable relative position between the two as regulated by the preloaded element. The custom design ensures that the force applied on the device is in a known relationship to the resulting operating velocity of the device, and vice-versa, as required by the specific application to achieve the desired feel characteristics. In an example with a different implementation, the flow regulating assembly 24 may have more than one preloaded element, and more than one flow restricting element. Other hydro-mechanical elements may be included to compensate for effects, including but not limited to thermal expansion and piston head surface area differences.

The present invention may have a flow regulating assembly which exhibits two or more multi-stable characteristics for the constant resisting force component at the maximum threshold depending on a portion of the operating stroke of the device used. This can be accomplished by a connection between the fluid displacing element and the flow regulating assembly which adjusts the flow regulating assembly depending on the position of the fluid displacing element.

The present invention may have a flow regulating assembly which exhibits two different characteristics for the constant resisting force component at the maximum threshold depending on the direction of the input force of the device used. This can be accomplished by defining the performance of the flow regulating assembly dependent on the direction of the fluid flow.

The present invention may have a flow regulating assembly which exhibits two or more multi-stable characteristics for the constant resisting force component at the maximum threshold depending on the input speed, hence force of the device used. This can be accomplished by defining the performance of the flow regulating assembly, such that its performance changes when defined pressure magnitudes have been reached. Thus, in one embodiment, the constant resisting force component is at the controlled maximum threshold which has two or more multi-stable defined values depending on the portion of the operating stroke used.

The present invention may be utilized with a working fluid that has a viscosity that can be altered in a controlled manner. This might be by way of application of a magnetic field, or an electric field, or an electric current, or applied hydrostatic pressure, or by altering the temperature of the working fluid. The working fluid may have non-Newtonian properties, i.e., variable viscosity. Variation of the viscosity changes the pressure required for the working fluid to pass through the flow regulating assembly, therefore affecting the characteristics of the device.

Referring again now to FIG. 2, the present invention may have a flow regulating assembly which exhibits characteristics for segments "b" and "d" that can be linear or non-linear, and may exhibit continuous or discontinuous characteristics. This can be accomplished by defining the performance of the flow regulating assembly, such that its performance changes when defined pressure magnitudes have been reached. For each range between the defined pressure magnitudes, the device can have a characteristic that is different from neighboring pressure ranges.

Operation of the invention is explained in the following paragraphs.

Figure 3A:
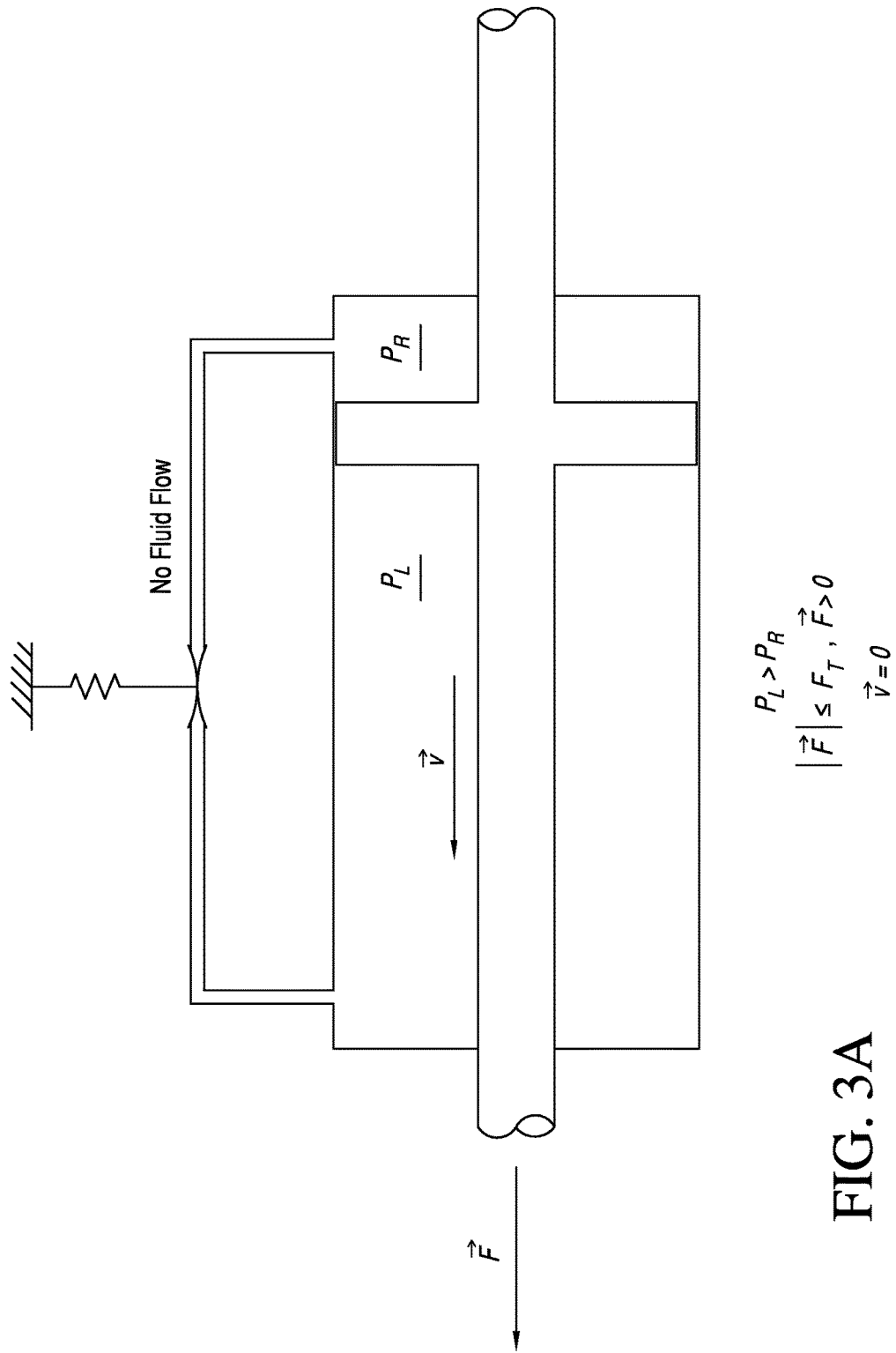
FIG. 3A is a simplified schematic illustration of an operational state of the hydro-mechanical device where the applied force, $\vec{F}$ is greater than 0, but not of sufficient magnitude to effect motion of the fluid displacing element, such that $\vec{v}$ is equal to 0.

Referring now to FIG. 3A, with the force applied as shown, the applied force $\vec{F}$ is greater than 0, but not of sufficient magnitude to effect motion of the fluid displacing element: $|\vec{F}| \leq F_T$, $\vec{F} > 0$, where $F_T$ is defined as the maximum threshold above which is sufficient to effect motion of the fluid displacing element. Thus, $\vec{v}$ is equal to 0, where $\vec{v}$ denotes the velocity of the fluid displacing element 18. As force is applied to the fluid displacing element, pressure of the fluid in the cavity 20, $P_L$, increases with respect to the pressure of the fluid in the cavity 22, $P_R$. This pressure differential generates a force on the preloaded flow regulating assembly, however this force is not of sufficient magnitude to overcome the preload, therefore the flow regulating assembly remains closed. Referring again now to FIG. 2, segment "a" denotes the relationship between applied force and velocity described in FIG. 3A.

Figure 3B:
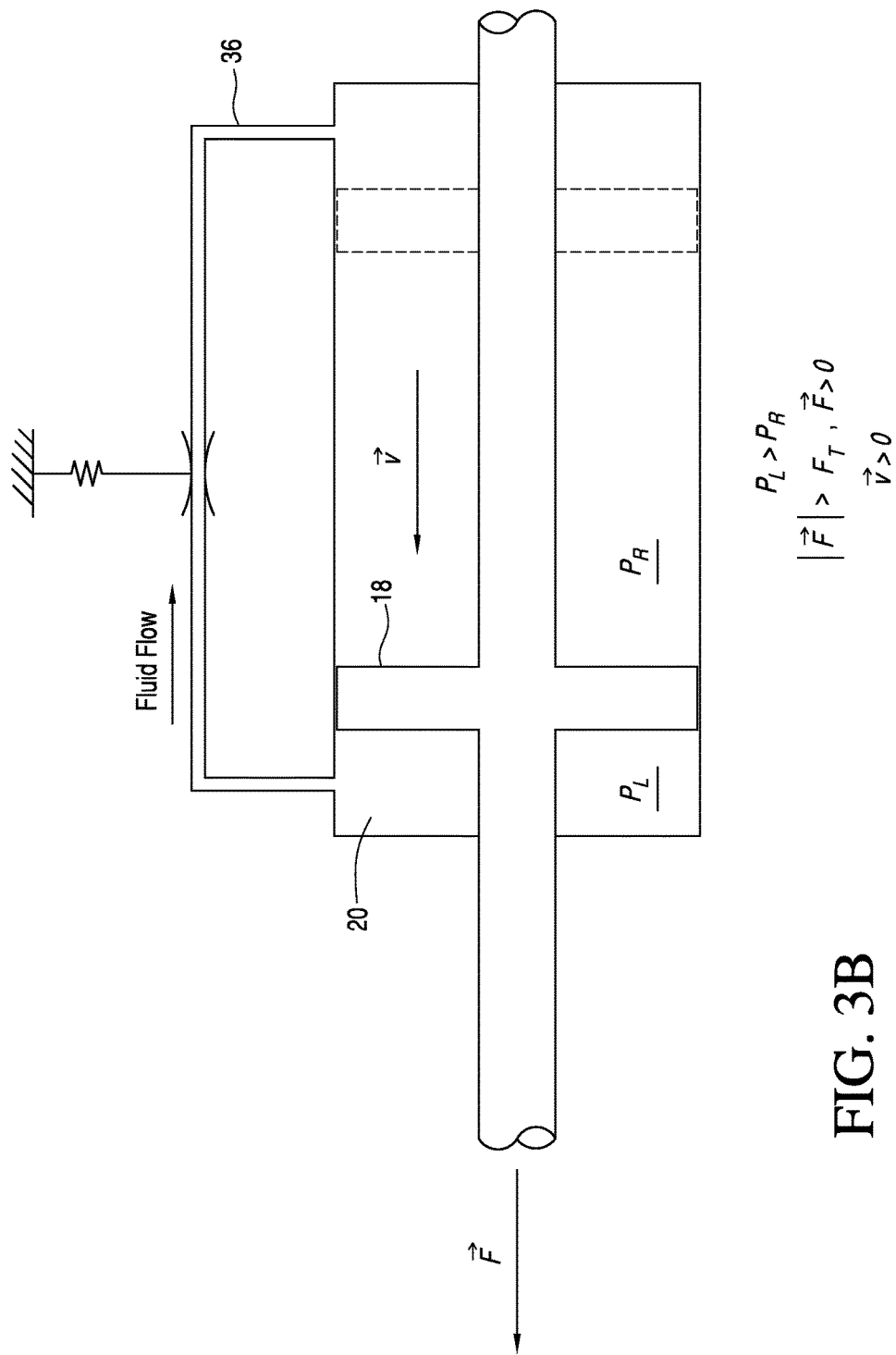
FIG. 3B is a simplified schematic illustration of an operational state of the hydro-mechanical device where the applied force, $\vec{F}$ is greater than 0, and of sufficient magnitude to effect motion of the fluid displacing element, such that $\vec{v}$ is greater than 0.

Referring now to FIG. 3B, with the force applied as shown, the applied force $\vec{F}$ is greater than 0, and its magnitude greater than the maximum threshold $F_T$, and therefore sufficient to effect motion of the fluid displacing element: $|\vec{F}| > F_T$, $\vec{F} > 0$, where $F_T$ is defined as the maximum threshold above which is sufficient to effect motion of the fluid displacing element. Thus, $\vec{v}$ is greater than 0, where $\vec{v}$ denotes the velocity of the fluid displacing element 18. As force is applied to the fluid displacing element, pressure of the fluid in the cavity 20, $P_L$, increases with respect to the pressure of the fluid in the cavity 22, $P_R$. This pressure differential generates a force on the preloaded flow regulating assembly of sufficient magnitude to overcome the preload, therefore the flow regulating assembly opens. With the flow regulating assembly open, fluid can flow through the conduit 36, therefore allowing movement of the fluid displacing element 18. Referring again now to FIG. 2, segment "b" denotes the relationship between applied force and velocity described in FIG. 3B.

Figure 3C:
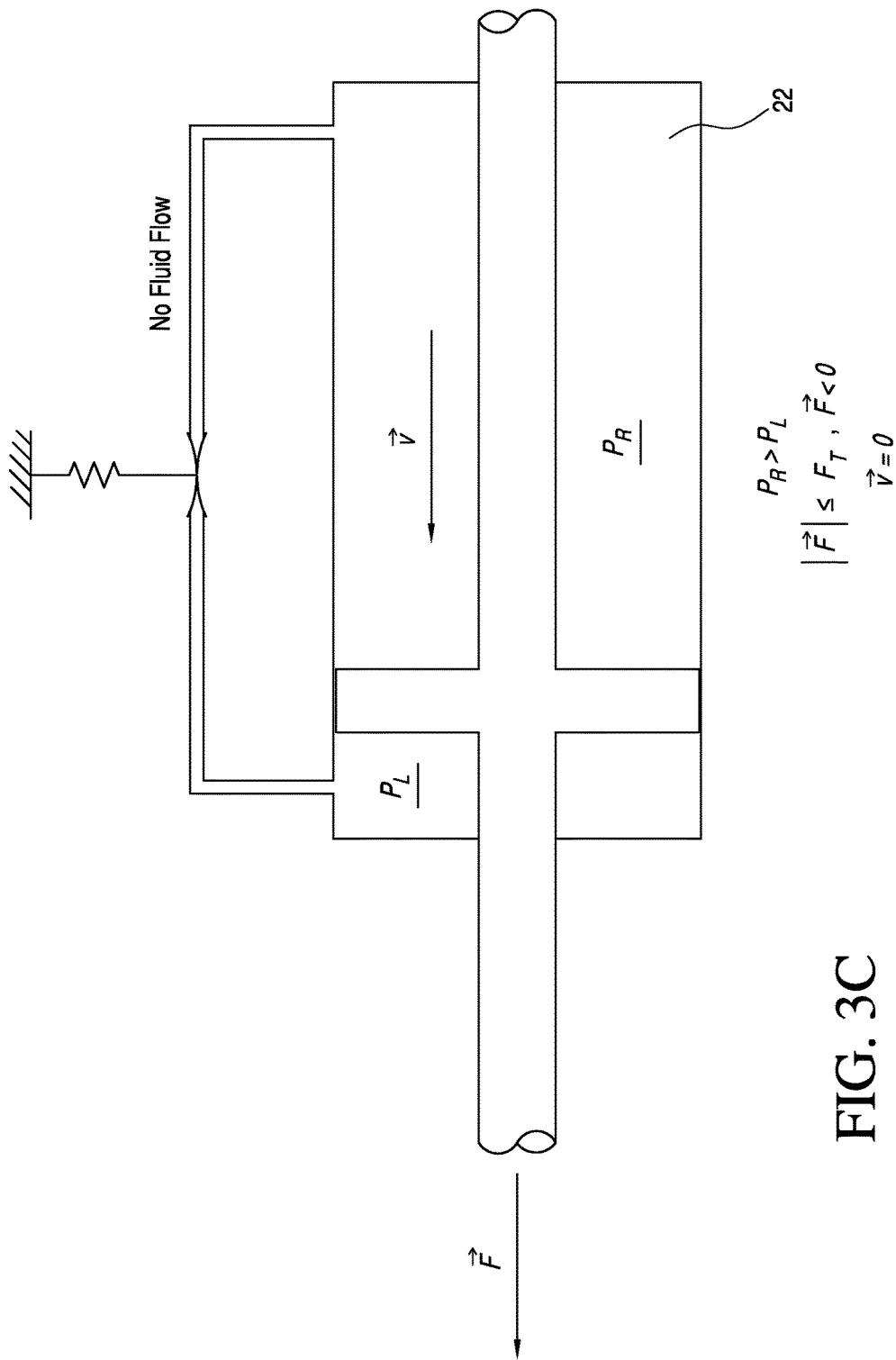
FIG. 3C is a simplified schematic illustration of an operational state of the hydro-mechanical device where the applied force, $\vec{F}$ is less than 0, but not of sufficient magnitude to effect motion of the fluid displacing element, such that $\vec{v}$ is equal to 0.

Referring now to FIG. 3C, with the force $\vec{F}$ applied as shown, the applied force $\vec{F}$ is less than 0, i.e. applied in opposite direction than in FIG. 3A, and not of sufficient magnitude to effect motion of the fluid displacing element: $|\vec{F}| \leq F_T$, $\vec{F} < 0$, where $F_T$ is defined as the maximum threshold above which is sufficient to effect motion of the fluid displacing element. Thus, $\vec{v}$ is equal to 0, where $\vec{v}$ denotes the velocity of the fluid displacing element 18. As force is applied to the fluid displacing element, pressure of the fluid in the cavity 22, $P_R$, increases with respect to the pressure of the fluid in the cavity 20, $P_L$. This pressure differential generates a force on the preloaded flow regulating assembly, however this force is not of sufficient magnitude to overcome the preload, therefore the flow regulating assembly remains closed. Referring again now to FIG. 2, segment "c" denotes the relationship between applied force and velocity described in FIG. 3C.

Figure 3D:
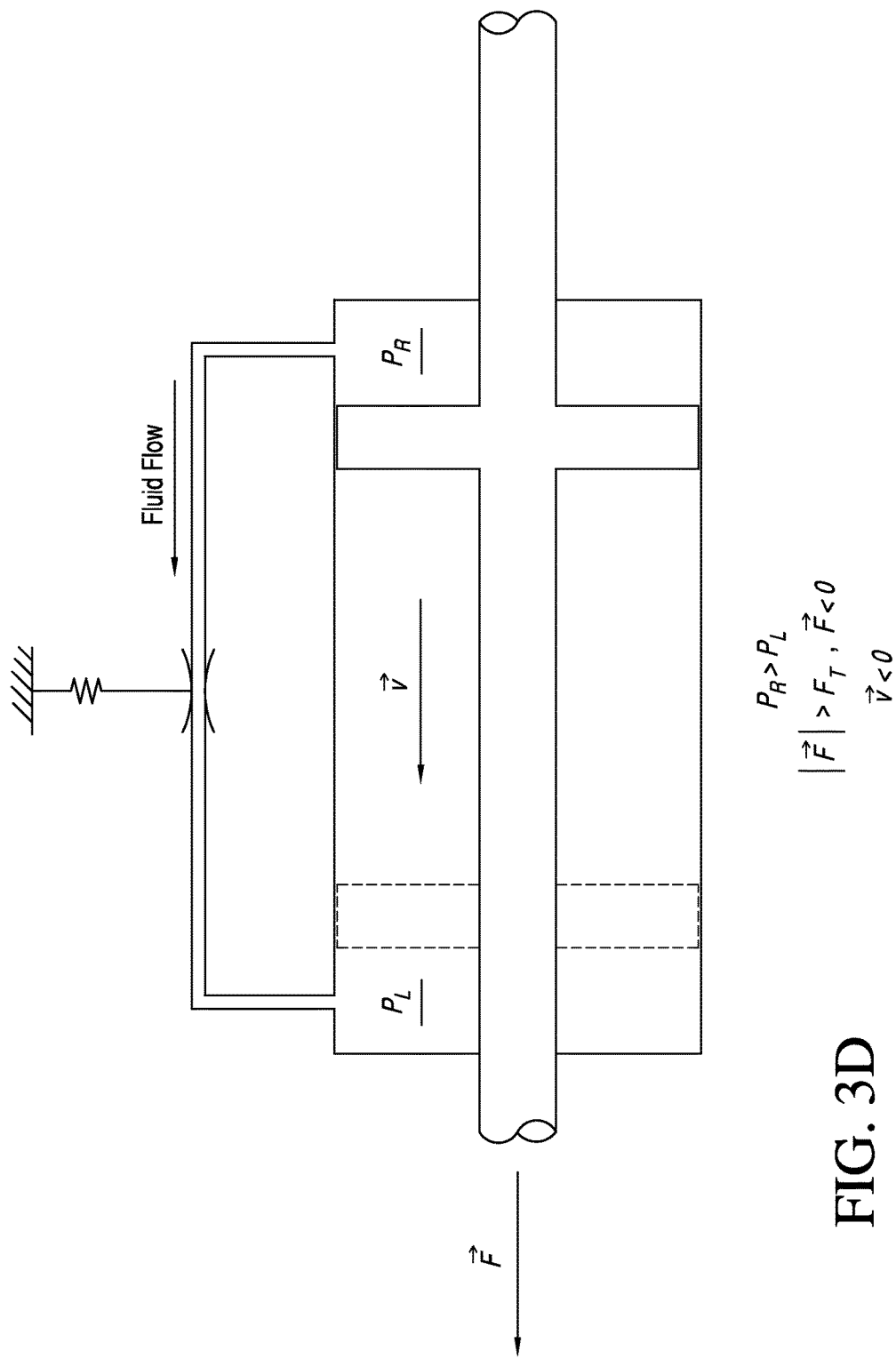
FIG. 3D is a simplified schematic illustration of an operational state of the hydro-mechanical device where the applied force, $\vec{F}$ is less than 0, and of sufficient magnitude to effect motion of the fluid displacing element, such that $\vec{v}$ is less than 0.

Referring now to FIG. 3D, with the force applied as shown, the applied force $\vec{F}$ is less than 0, and its magnitude greater than the maximum threshold $F_T$, and therefore sufficient to effect motion of the fluid displacing element: $|\vec{F}| > F_T$, $\vec{F} < 0$, where $F_T$ is defined as the maximum threshold above which is sufficient to effect motion of the fluid displacing element. Thus, $\vec{v}$ is less than 0, where $\vec{v}$ denotes the velocity of the fluid displacing element 18. As force is applied to the fluid displacing element, pressure of the fluid in the cavity 22, $P_R$, increases with respect to the pressure of the fluid in the cavity 20, $P_L$. This pressure differential generates a force on the preloaded flow regulating assembly of sufficient magnitude to overcome the preload, therefore the flow regulating assembly opens. With the flow regulating assembly open, fluid can flow through the conduit 36, therefore allowing movement of the fluid displacing element 18. Referring again now to FIG. 2, segment "d" denotes the relationship between applied force and velocity described in FIG. 3D.

The invention can be embodied as a linear hydro-mechanical device (e.g., piston) as described above, or as in a rotary hydro-mechanical device, e.g., a vane. For a rotary device, the explanation would be as elaborated below.

Referring now to FIGS. 4A and 4B, the invention is shown implemented as a rotary hydro-mechanical device 38, where the applied torque, $\vec{M}$ is greater than 0, but not of sufficient magnitude to effect motion of the fluid displacing element 40. Thus $\vec{\omega}$ is equal to 0, whereas $\vec{\omega}$ denotes the velocity of the fluid displacing element 40. As torque is applied to the fluid displacing element, pressure of the fluid, $P_B$, increases with respect to the pressure of the fluid, $P_A$. This pressure differential generates a force on the preloaded flow regulating assembly, however this force is not of sufficient magnitude to overcome the maximum threshold, hence preload of the flow regulating assembly which therefore remains closed.

Figure 4C:
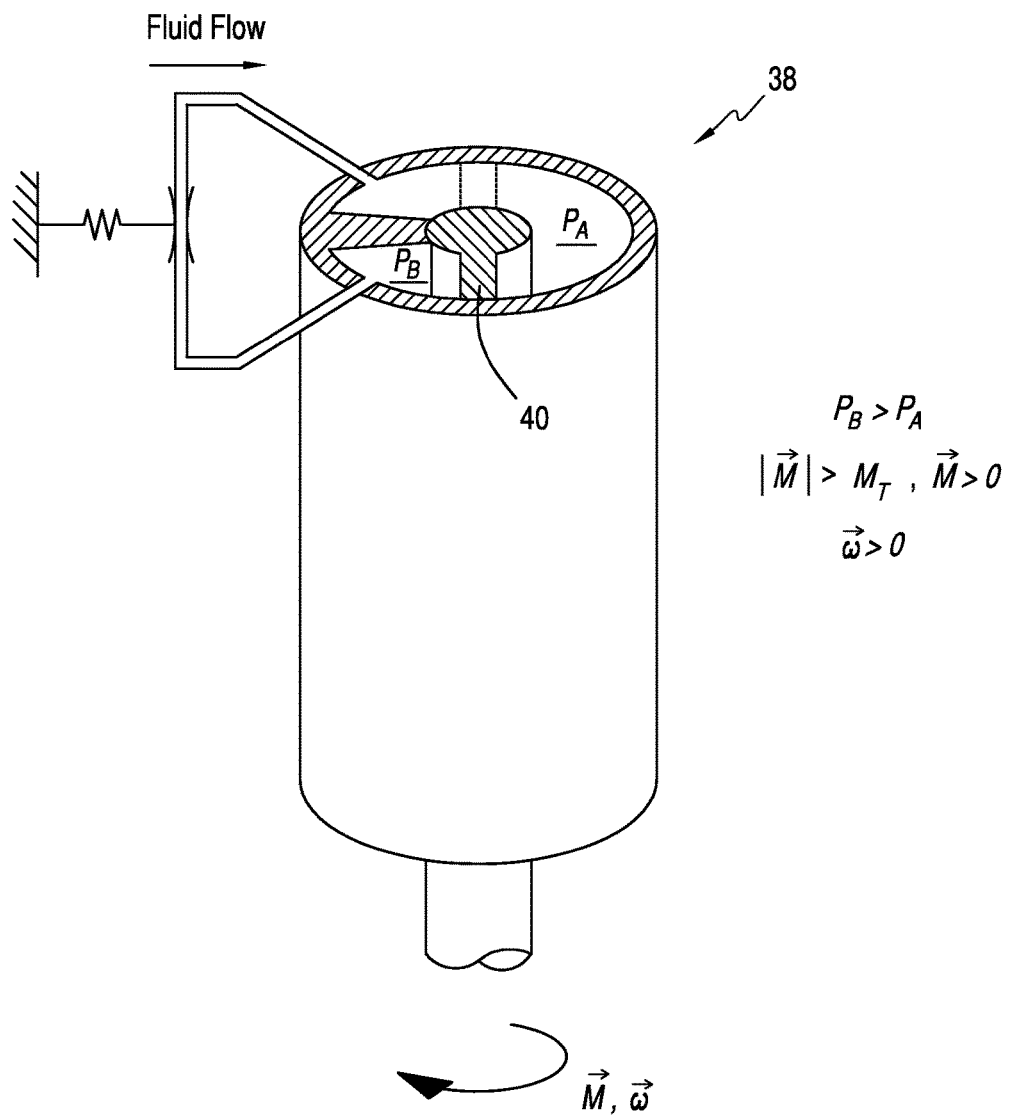
FIG. 4C is a simplified front perspective view of the hydro-mechanical device where the applied moment, $\vec{M}$ is greater than 0, and of sufficient magnitude to effect motion of the fluid displacing element, such that the angular velocity, $\vec{\omega}$, is greater than 0.

Referring now to FIG. 4C, the applied torque, $\vec{M}$ is greater than 0, and of sufficient magnitude to exceed the maximum threshold $M_T$, and therefore sufficient to effect motion of the fluid displacing element 40, Thus, $\vec{\omega}$ is greater than 0. As torque is applied to the fluid displacing element, pressure of the fluid, $P_B$, increases with respect to the pressure of the fluid, $P_A$. This pressure differential generates a force on the preloaded flow regulating assembly of sufficient magnitude to overcome the maximum threshold, hence preload of the flow regulating assembly which therefore opens. With the flow regulating assembly open, fluid can flow through the conduit.

Figure 4D:
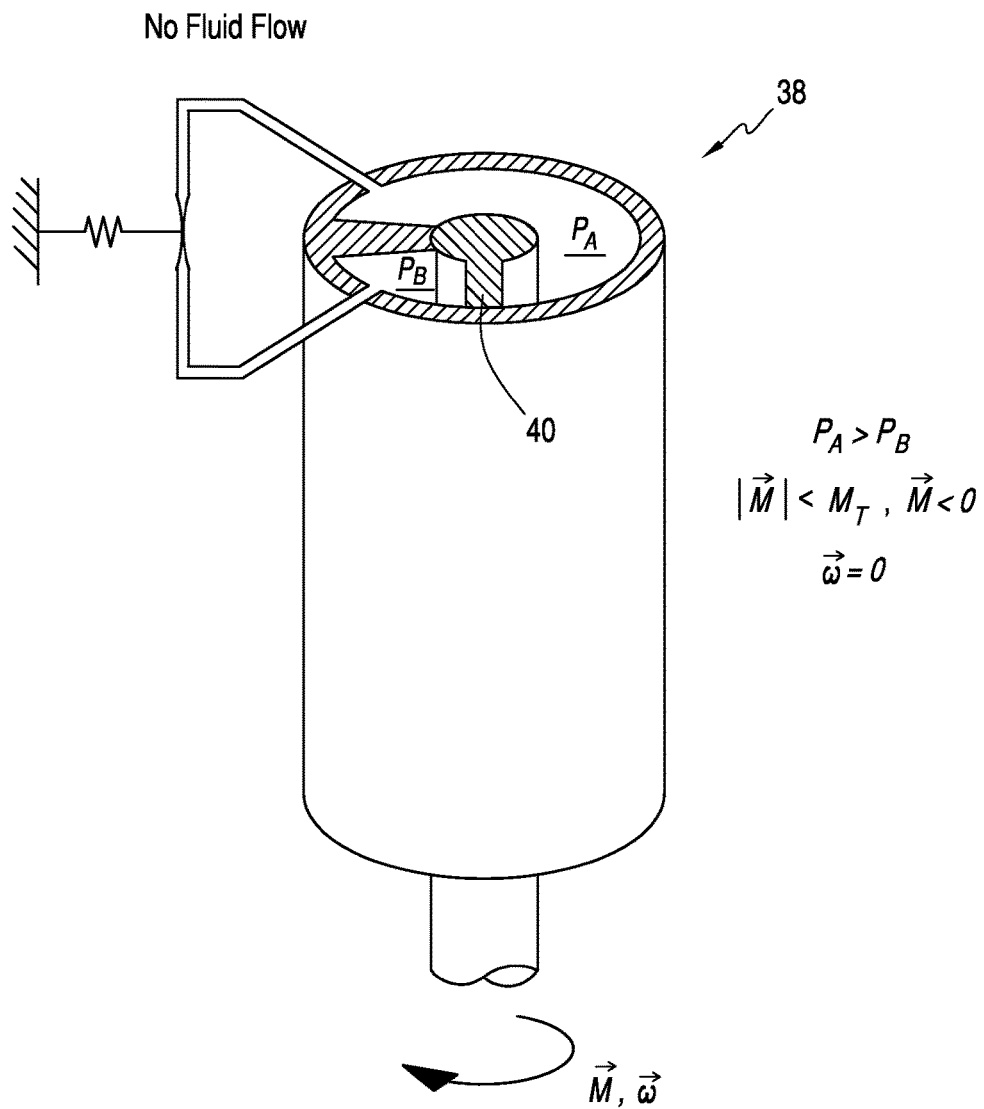
FIG. 4D is a simplified front perspective view of the hydro-mechanical device where the applied moment, $\vec{M}$ is less than 0, but not of sufficient magnitude to effect motion of the fluid displacing element, such that $\vec{\omega}$ is equal to 0.

Referring now to FIG. 4D, the applied torque $\vec{M}$ is less than 0, i.e. applied in opposite direction than in FIG. 4A, and not of sufficient magnitude to effect motion of the fluid displacing element 40. Thus, $\vec{\omega}$ is equal to 0. As torque is applied to the fluid displacing element, pressure of the fluid, $P_A$, increases with respect to the pressure of the fluid, $P_B$. This pressure differential generates a force on the preloaded flow regulating assembly; however this force is not of sufficient magnitude to overcome the maximum threshold, hence preload of the flow regulating assembly which therefore remains closed.

Figure 4E:
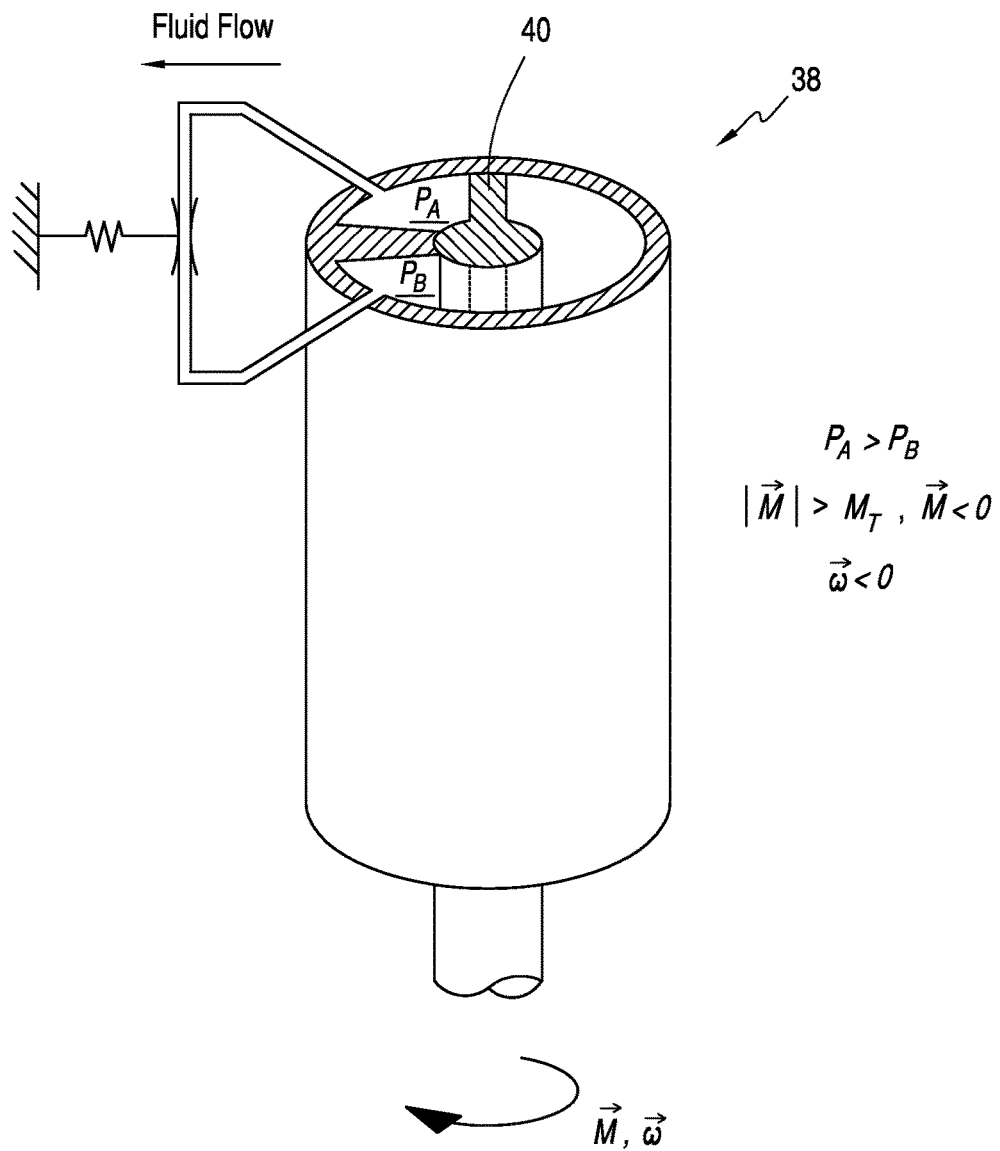
FIG. 4E is a simplified front perspective view of the hydro-mechanical device where the applied moment, $\vec{M}$ is less than 0, and of sufficient magnitude to effect motion of the fluid displacing element, such that $\vec{\omega}$ is less than 0.

Referring now to FIG. 4E, the applied torque, $\vec{M}$ is less than 0, and of greater magnitude than the maximum threshold $M_T$, and therefore sufficient to effect motion of the fluid displacing element 40. Thus, $\vec{\omega}$ is less than zero, accordingly. As torque is applied to the fluid displacing element, pressure of the fluid, $P_A$, increases with respect to the pressure of the fluid, $P_B$. This pressure differential generates a force on the preloaded flow regulating assembly of sufficient magnitude to overcome the threshold, hence preload of the flow regulating assembly which therefore opens. With the flow regulating assembly open, fluid can flow through the conduit.

Figure 5:
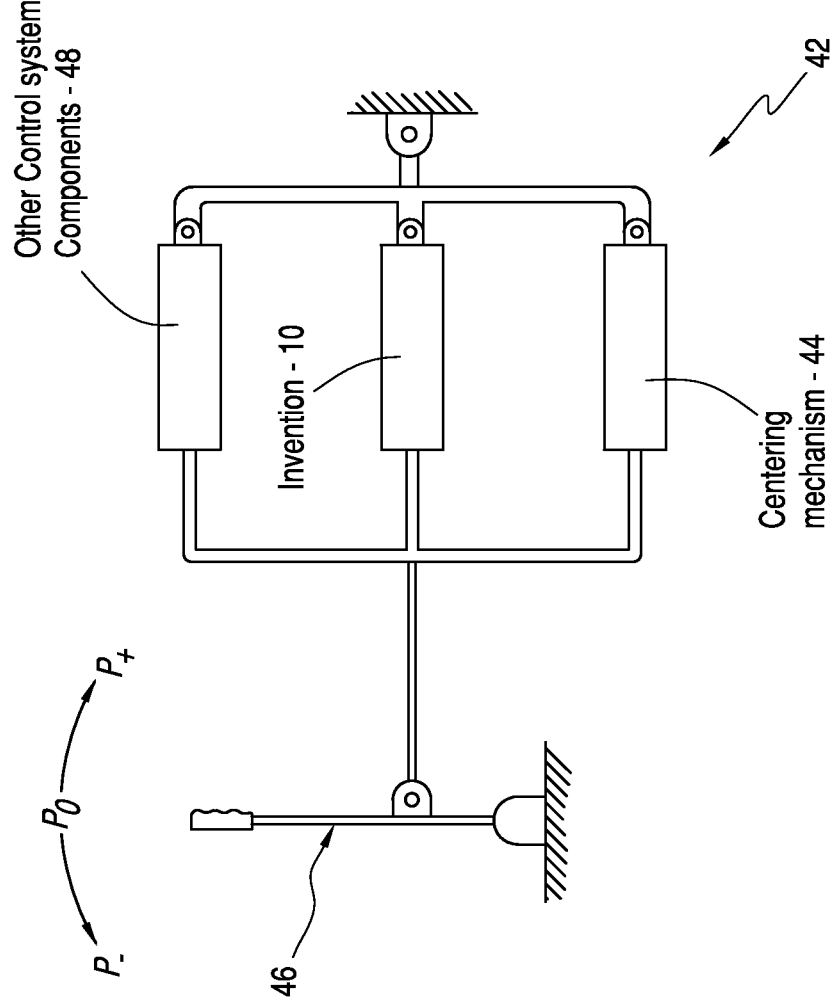
FIG. 5 is a simplified schematic illustration of the hydro-mechanical device in a control system having a centering mechanism.

Referring now to FIG. 5, the hydro-mechanical device 10 of the present invention is shown integrated into a control system, designated generally as 42. The hydro-mechanical device 10 may be, for example, part of a vehicle control system 42 for an aircraft. The control system 42 includes a centering mechanism 44. An inceptor 46 is operatively connected to the hydro-mechanical device 10. The inceptor 46, in an aircraft may be, for example, a control stick, side stick, rudder, control wheel, control column, or center stick, which is used to interact with other control system components 48.

Figure 6:
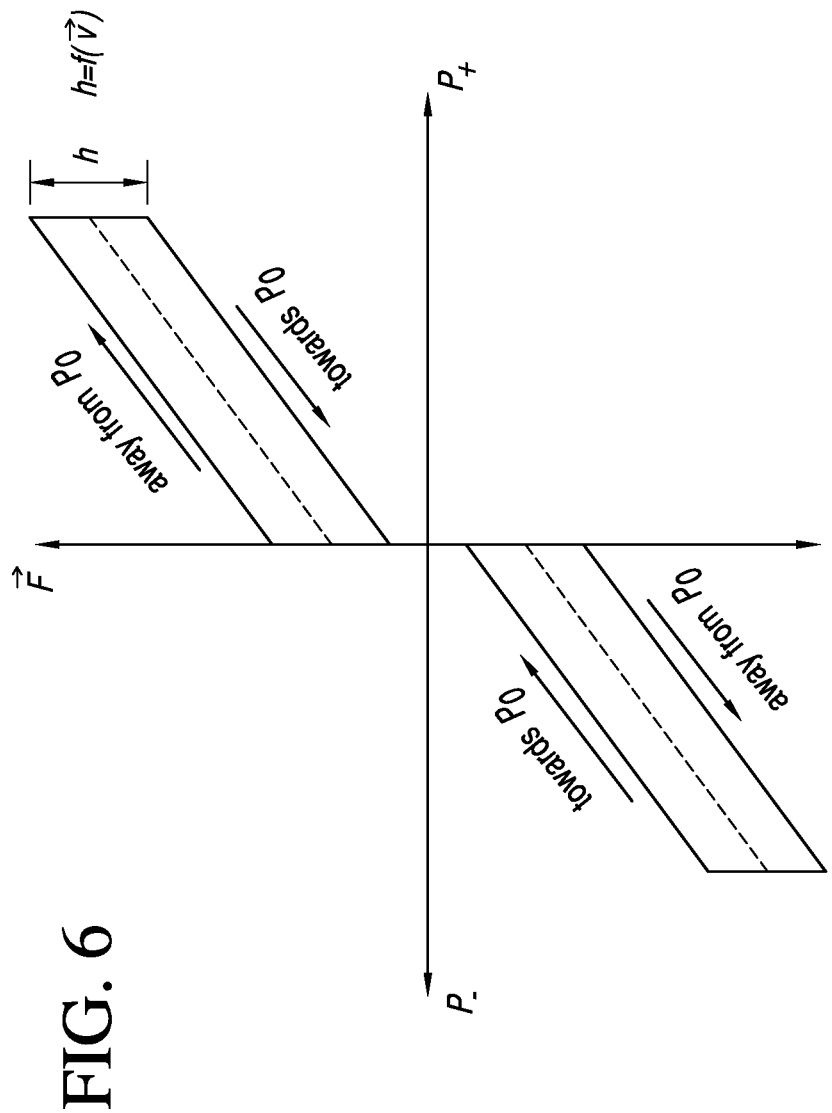
FIG. 6 is a graph of position vs. force of the control system of FIG. 5, showing the generation of a force feel hysteresis.

The hydro-mechanical device of the present invention may provide the functions described above to a manned or remote operated, rotary or fixed wing, aircraft's pilot control system to provide the functions of speed-dependent feel force (i.e. damping) and controlled resisting force (e.g. friction), to the pilot inceptors, obviating the need for multiple devices (e.g. combinations of friction brake, other hydro-mechanical devices, and/or electromagnetic-type devices) to accomplish resisting force and damping functions as depicted, for example, in FIG. 6.

The hydro-mechanical device of the present invention may provide the functions described above to a manned or remote operated land- or seaborne vehicle's control system to provide the functions of speed-dependent feel force (i.e. damping) and controlled resisting force (e.g. friction), to the human machine interface inceptors, obviating the need for multiple devices (e.g. combinations of friction brake, other hydro-mechanical devices, and/or electromagnetic-type devices) to accomplish resisting force and damping functions as depicted, for example, in FIG. 6.

Thus, the present invention overcomes performance degradation and environmental performance instability and creates a pilot inceptor force feel hysteresis commonly created by means of sliding contact friction. It eliminates an entire separate component group (i.e. friction brake-type device) and consolidates the function into one device. It minimizes performance issues inherent with existing devices.

The present invention is a hydraulic device not subject to typical abrasive wear, that unifies the function of providing a constant force (analogous to sliding contact friction) to a mechanism in combination with the function of damping that mechanism. This is achieved by employing a variable-cross section orifice in the damper, using very simple components, which controls the volumetric flow of the hydraulic fluid in a known relationship to the fluid pressure inside the device, which in turn has a known relationship to the force applied to the device. Depending on component tuning, the device may have the capability of providing a constant force over a wide input speed range.

Other embodiments and configurations may be devised without departing from the spirit of the invention and the scope of the appended claims.

The invention claimed is:
1. A hydro-mechanical device for providing tactile feel curve shaping, comprising:
   a) a housing having a working fluid chamber formed therein, said working fluid chamber containing working fluid;
   b) a fluid displacing element positioned within the working fluid chamber, said fluid displacing element dividing the working fluid chamber into at least two cavities upon which fluid is transferred upon movement of said fluid displacing element; and,
   c) a preloaded flow regulating assembly operatively connected to said housing,
      wherein said preloaded flow regulating assembly comprises a preloaded element comprising a spring that prevents flow of fluid between the at least two cavities until a predetermined pressure is achieved, and affects flow of fluid once said predetermined pressure has been exceeded in cooperation with a flow restriction element comprising a plunger attached to an end of the spring that opposes the flow of the working fluid, said plunger being located in an orifice of a working fluid conduit connected to said housing,
      wherein the flow of said working fluid is controlled through said preloaded flow regulating assembly in accordance with a custom force profile combining a controlled velocity dependent force component and a controlled resisting force component, which opposes an applied force at a controlled maximum threshold;
      wherein said controlled velocity dependent force component is controlled by one or more of said preloaded elements and one or more flow restriction elements which oppose the flow of the working fluid, thereby forming a pressure differential across the flow regulating assembly, wherein a cooperation of each orifice and each plunger achieves desired device performance as a result of the variable relative position between the orifice and the plunger as regulated by the preloaded element; and,
      wherein said controlled resisting force component is controlled by said one or more preloaded elements and said one or more flow restriction elements which prevent the flow of fluid between the two cavities until a predetermined pressure at the controlled maximum threshold is achieved,
      wherein said custom force profile is defined by an F-v orthogonal coordinate system, where F is the ordinate force axis and v is the abscissa velocity axis, said custom force profile comprising an "a" segment, a "b" segment, a "c" segment, and a "d" segment, wherein said "a" segment and said "c" segment each have one endpoint at an origin of the coordinate system and extend along the ordinate to another endpoint, said "a" segment extending to $F_T$, which is said controlled maximum threshold, said "c" segment extending to $-F_T$, which is said controlled maximum threshold in the opposite direction, wherein said "b" segment extends from said $F_T$ endpoint of said "a" segment with a continuous, positive slope and said "d" segment extends from said $-F_T$ endpoint of said "c" segment with a continuous, negative slope.

2. The hydro-mechanical device of claim 1, wherein said controlled resisting force component comprises a constant resisting force component, said constant resisting force component being at said controlled maximum threshold.

3. The hydro-mechanical device of claim 1, wherein said controlled resisting force component comprises a constant resisting force component, said constant resisting force component being at said controlled maximum threshold which has two or more multi-stable defined values depending on a portion of an operating stroke used.

4. The hydro-mechanical device of claim 1, wherein said controlled resisting force component comprises a constant resisting force component, said constant resisting force component being at said controlled maximum threshold which has two defined values depending on a direction of an operating stroke used.

5. The hydro-mechanical device of claim 1, wherein said controlled resisting force component comprises a constant resisting force component, said constant resisting force component being at said controlled maximum threshold which has two or more multi-stable defined values depending on an input speed used.

6. The hydro-mechanical device of claim 1, wherein said hydro-mechanical device is incorporated in an aircraft's pilot control system to provide functions of speed-dependent feel force and controlled resisting force, to pilot inceptors, obviating the need for multiple devices to accomplish friction and damping functions.

7. The hydro-mechanical device of claim 1, wherein said working fluid has a viscosity that can be altered in a controlled manner.

8. The hydro-mechanical device of claim 1, wherein said working fluid has a variable viscosity.

9. The hydro-mechanical device of claim 1, further comprising a centering mechanism.

10. The hydro-mechanical device of claim 1, wherein said fluid displacing element comprises a piston.

11. The hydro-mechanical device of claim 1, wherein said fluid displacing element comprises a vane.

12. A control system, comprising:
a) a hydro-mechanical device for providing tactile feel curve shaping, comprising:
i) a housing having a working fluid chamber formed therein, said working fluid chamber containing working fluid;
ii) a fluid displacing element positioned within the working fluid chamber, said fluid displacing element dividing the working fluid chamber into at least two cavities upon which fluid is transferred upon movement of said fluid displacing element; and,
iii) a preloaded flow regulating assembly operatively connected to said housing,
wherein said preloaded flow regulating assembly comprises a preloaded element comprising a spring that prevents flow of fluid between the at least two cavities until a predetermined pressure is achieved, and affects flow of fluid once said predetermined pressure has been exceeded in cooperation with a flow restriction element comprising a plunger attached to an end of the spring that opposes the flow of the working fluid, said plunger being located in an orifice of a working fluid conduit connected to said housing,
wherein the flow of said working fluid is controlled through said preloaded flow regulating assembly in accordance with a custom force profile combining a controlled velocity dependent force component and a controlled resisting force component, which opposes an applied force at a controlled maximum threshold;
wherein said controlled velocity dependent force component is controlled by one or more of said preloaded elements and one or more flow restriction elements which oppose the flow of the working fluid, thereby forming a pressure differential across the flow regulating assembly, wherein a cooperation of each orifice and each plunger achieves desired device performance as a result of the variable relative position between the orifice and the plunger as regulated by the preloaded element; and,
wherein said controlled resisting force component is controlled by said one or more preloaded elements and said one or more flow restriction elements which prevent the flow of fluid between the two cavities until a predetermined pressure at the controlled maximum threshold is achieved,
wherein said custom force profile is defined by an F-v orthogonal coordinate system, where F is the ordinate force axis and v is the abscissa velocity axis, said custom force profile comprising an "a" segment, a "b" segment, a "c" segment, and a "d" segment, wherein said "a" segment and said "c" segment each have one endpoint at an origin of the coordinate system and extend along the ordinate, said "a" segment extending to $F_T$, which is said controlled maximum threshold, said "c" segment extending to $-F_T$, which is said controlled maximum threshold in the opposite direction, wherein said "b" segment extends from said $F_T$ endpoint of said "a" segment with a continuous, positive slope and said "d" segment extends from said $-F_T$ endpoint of said "c" segment with a continuous, negative slope; and,
b) an inceptor operatively connected to said hydro-mechanical device.

13. The control system of claim 12, further comprising a centering mechanism.

14. The control system of claim 12, wherein said hydro-mechanical device is positioned within a vehicle.

15. The control system of claim 14, wherein said vehicle comprises an aircraft.

16. The control system of claim 14, further comprising a mechanism which returns the inceptor to a pre-defined position at a pre-defined position-force relationship.

17. The control system of claim 14, wherein said inceptor comprises a pilot inceptor.

18. A method for damping, comprising the steps of:
a) providing a housing having a working fluid chamber formed therein, said working fluid chamber containing working fluid;
b) providing a fluid displacing element positioned within the working fluid chamber, said fluid displacing element dividing the working fluid chamber into at least two cavities upon which fluid is transferred upon movement of said fluid displacing element;
c) providing a preloaded flow regulating assembly operatively connected to the housing and fluid displacing element; and,
d) controlling the working fluid between said housing, said fluid displacing element, and said preloaded flow regulating assembly to achieve performance characteristics including a force profile combining a controlled velocity dependent force component and a controlled resisting force component which opposes applied force at a controlled maximum threshold, wherein said preloaded flow regulating assembly comprises a preloaded element comprising a spring that prevents flow of fluid between the at least two cavities until a predetermined pressure is achieved, and affects flow of fluid once said predetermined pressure has been exceeded in cooperation with a flow restriction element comprising a plunger attached to an end of the spring that opposes the flow of the working fluid, said plunger being located in an orifice of a working fluid conduit connected to said housing;

wherein said controlled velocity dependent force component is controlled by one or more of said preloaded elements and one or more flow restriction elements which oppose the flow of the working fluid, thereby forming a pressure differential across the flow regulating assembly, wherein a cooperation of each orifice and each plunger achieves desired device performance as a result of the variable relative position between the orifice and the plunger as regulated by the preloaded element; and, wherein said controlled resisting force component is controlled by said one or more preloaded elements and said one or more flow restriction elements which prevent the flow of fluid between the two cavities until a predetermined pressure at the controlled maximum threshold is achieved, wherein said custom force profile is defined by an F-v orthogonal coordinate system, where F is the ordinate force axis and v is the abscissa velocity axis, said custom force profile comprising an "a" segment, a "b" segment, a "c" segment, and a "d" segment, wherein said "a" segment and said "c" segment each have one endpoint at an origin of the coordinate system and extend along the ordinate, said "a" segment extending to $F_T$, which is said controlled maximum threshold, said "c" segment extending to $-F_T$, which is said controlled maximum threshold in the opposite direction, wherein said "b" segment extends from said $F_T$ endpoint of said "a" segment with a continuous, positive slope and said "d" segment extends from said $-F_T$ endpoint of said "c" segment with a continuous, negative slope.

\* \* \* \* \*